United States Patent [19]

Yarris

[11] Patent Number: 4,476,960
[45] Date of Patent: Oct. 16, 1984

[54] ADJUSTABLE CHAIN ANCHOR FOR LIFT TRUCKS

[75] Inventor: William T. Yarris, Mentor, Ohio

[73] Assignee: Towmotor Corporation, Mentor, Ohio

[21] Appl. No.: 406,617

[22] Filed: Aug. 9, 1982

[51] Int. Cl.³ .............................................. B66B 9/20
[52] U.S. Cl. .................................... 187/9 E; 410/103; 24/69 T
[58] Field of Search ............... 187/9 R, 9 E, 1 R, 20; 24/69 T, 68 TT, 69 R, 69 CT; 248/499, 500, 503; 410/100, 103, 72; 104/196, 117; 414/634, 630, 631

[56] References Cited

U.S. PATENT DOCUMENTS

| | | | |
|---|---|---|---|
| 2,207,688 | 7/1940 | Ulinski | 414/634 |
| 2,354,178 | 7/1944 | Ulinski | 187/9 R |
| 3,101,927 | 8/1963 | Gray | 410/103 |
| 3,158,107 | 11/1964 | Sharp | 410/103 |
| 3,394,778 | 7/1968 | Brinton | 187/9 E |
| 3,506,092 | 4/1970 | Shinoda et al. | 187/9 E |

FOREIGN PATENT DOCUMENTS 1035571 1/1959 Fed. Rep. of Germany .
1003397 9/1965 United Kingdom .

Primary Examiner—Joseph J. Rolla
Assistant Examiner—Kenneth Noland
Attorney, Agent, or Firm—Phillips, Moore, Lempio & Finley

[57] ABSTRACT

The lift system for the mast assembly of a lift truck normally includes at least one hydraulic cylinder and a pair of lift chains for selectively raising and lowering a movable assembly (upright or carriage assembly) on a fixed upright assembly. The tensions in the lift chains must be precisely set and periodically adjusted by use of an adjustable anchor, including a bolt threadably mounted on the fixed upright assembly and connected to the chain. Space limitations in present day mast assemblies have dictated the need for an adjustable chain anchor that is compact and is designed to be conveniently mounted on an upper end of the fixed upright assembly for ready access. The adjustable chain anchor (19) of this invention solves this problem by providing a cam member (26) adapted to be rotated to adjust chain tension in response to selective rotation of an end of the chain (17) about a fixed pivot axis (A).

8 Claims, 4 Drawing Figures

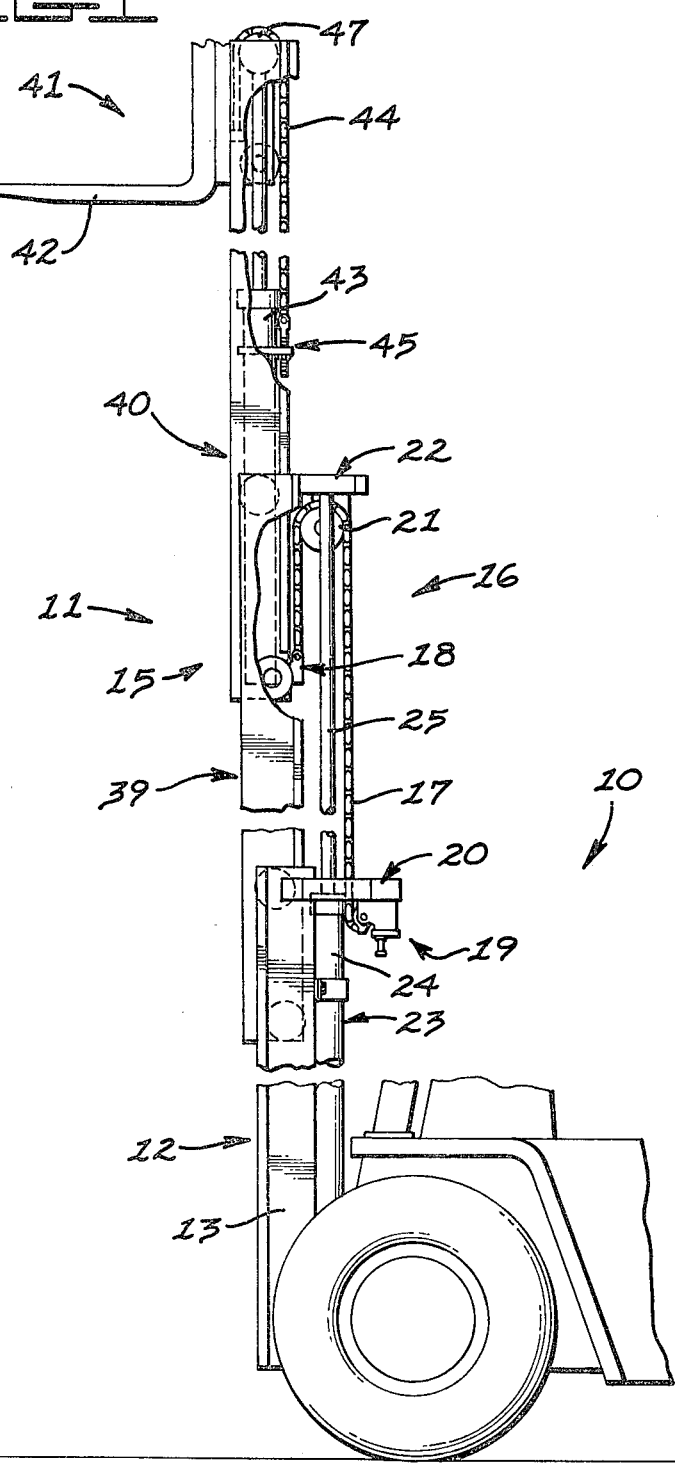

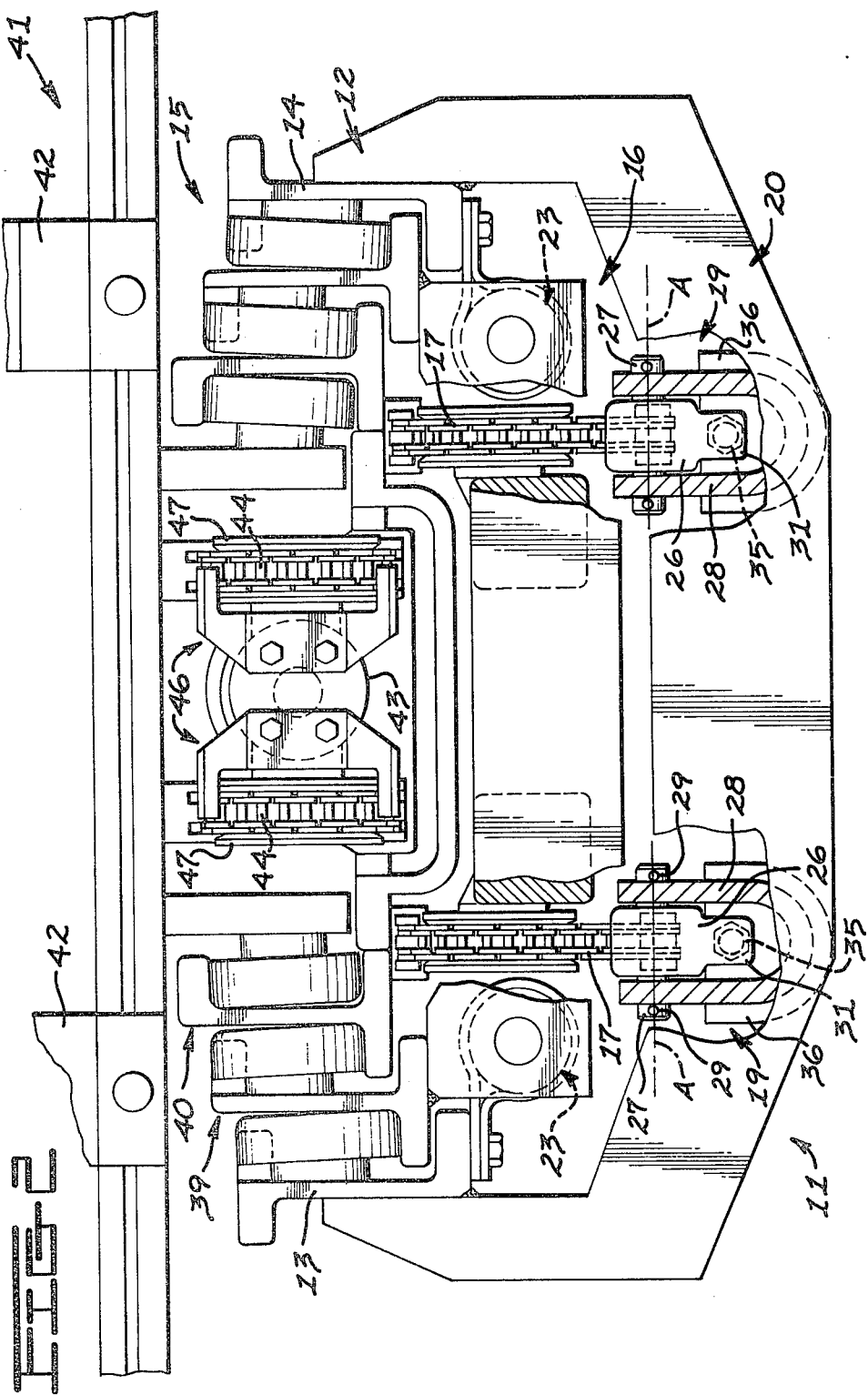

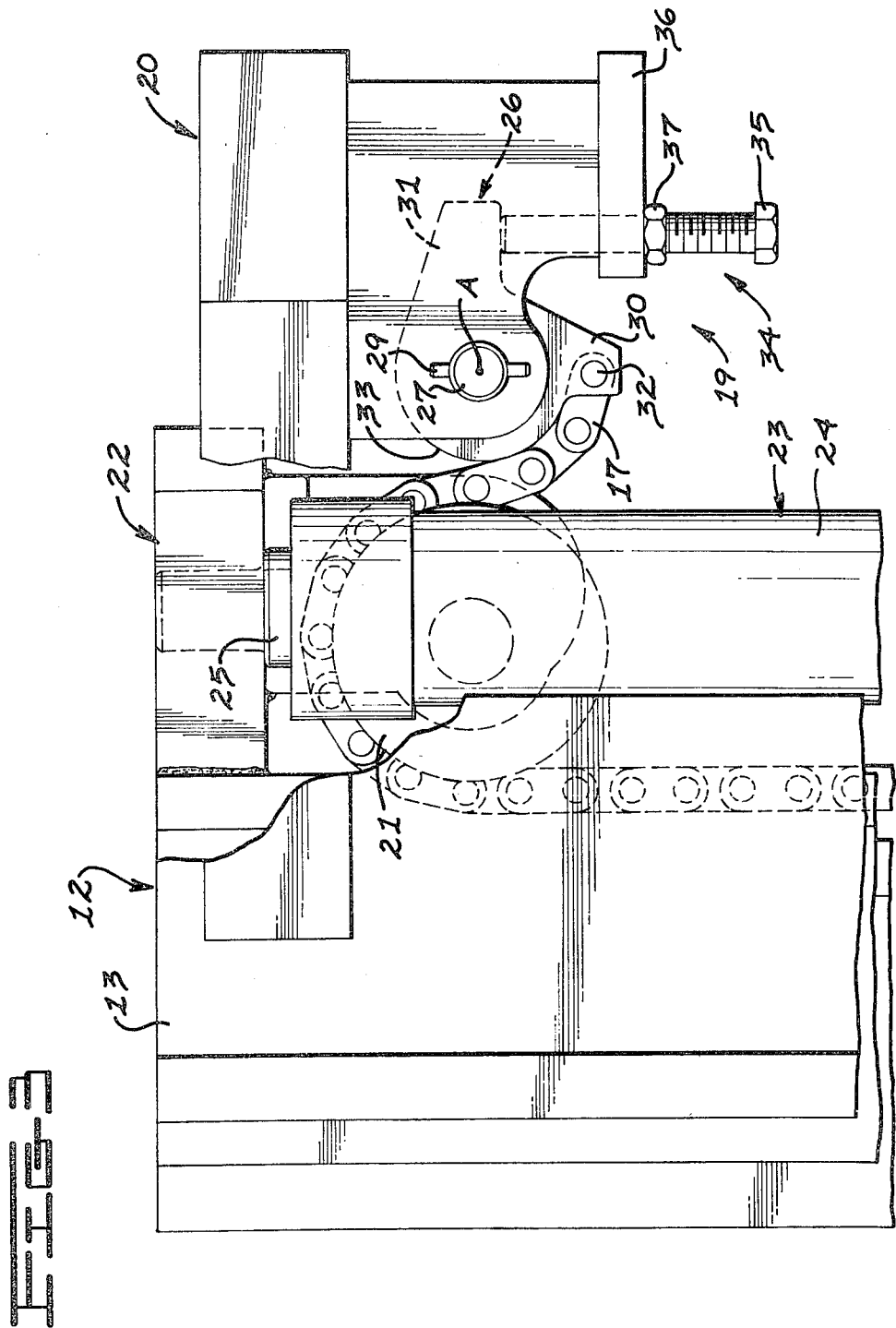

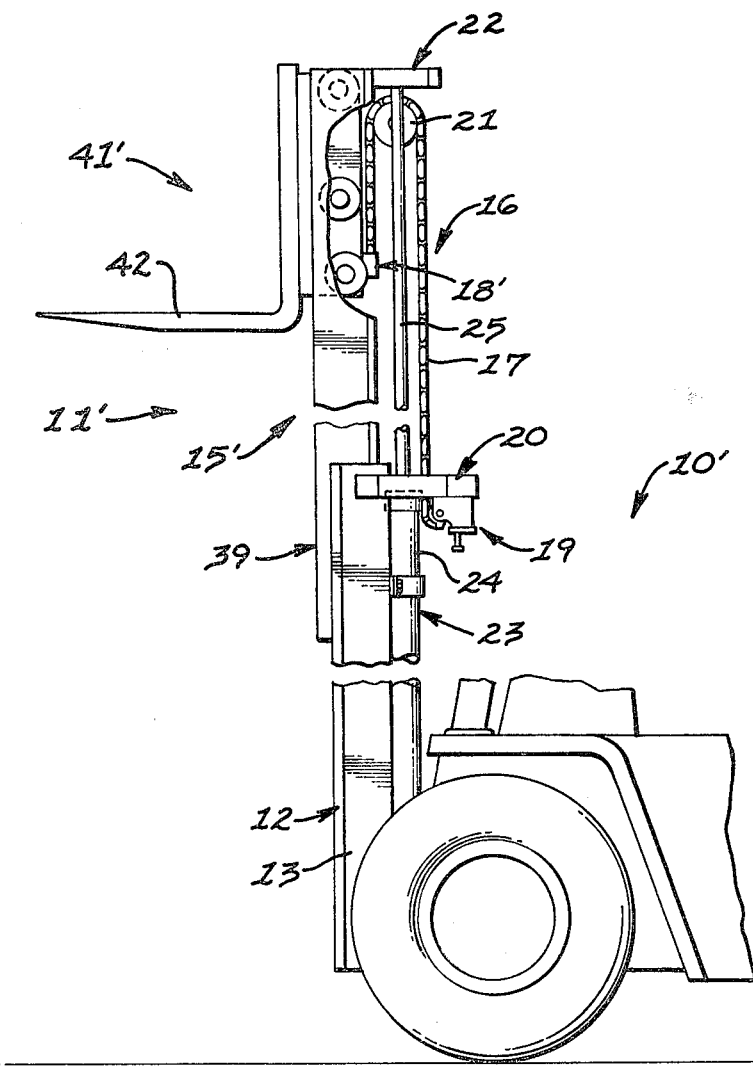

ADJUSTABLE CHAIN ANCHOR FOR LIFT TRUCKS

TECHNICAL FIELD

This invention relates generally to a lift system for the mast assembly of a lift truck and more particularly to an adjustable chain anchor for selectively adjusting the tension in a chain of the lift system.

BACKGROUND ART

The lift system employed on a mast assembly of a conventional lift truck normally includes a pair of laterally spaced and equally tensioned chains, each having first ends anchored to a fixed upright assembly and second ends anchored to a movable upright assmebly or to a movable carriage assembly. Chain tension must be periodically adjusted to ensure efficient raising and lowering of the movable assembly during operation of the lift truck. A typical adjustable chain anchor is disclosed in U.S. Pat. No. 4,009,765, issued on Mar. 1, 1977 to Edward V. Leskovec et al. Although adjustable chain anchors of this type have performed adequately, space limitations on present day "high visibility" mast assemblies dictate the need for an adjustable chain anchor that is compact and designed to be conveniently positioned adjacent to an upper end of the fixed upright assembly for ready access by a workman.

The present invention is directed to overcoming one or more of the problems as set forth above.

DISCLOSURE OF THE INVENTION

In one aspect of the present invention, a mast assembly has a movable assembly (upright or carriage assembly) mounted for relative movement on a fixed upright assembly and a lift system including at least one chain having opposite ends thereof anchored to the fixed and moveable assemblies. The improvement in the lift system comprises means for adjusting the tension in the chain in response to selective rotation of at least one end of the chain about a fixed pivot axis. The tension adjusting means comprises a cam member having the chain wrapped on an arcuate cam surface thereof, first and second circumferentially spaced arms secured on the cam member with the chain being attached to the first arm, and adjustment means, including a bolt, for engaging the second arm to pivot the cam member to adjust chain tension. Although the tension adjusting means finds particular application to adjusting chain tension in a mast assembly of a lift truck, for example, it is equally adapted for use in any suitable apparatus wherein it is desirable to adjust the tension in a chain connected between two members mounted for relative sliding movements.

The improved lift system provides a compact adjustment means that can be conveniently positioned at an accessible location at the upper end of the fixed upright assembly. The ability to adjust chain tension by rotating the end of the chain about a fixed pivot axis provides a closely controlled and highly leveraged system for closely calibrating chain tension.

BRIEF DESCRIPTION OF THE DRAWINGS

Other objects and advantages of this invention will become apparent from the following description and accompanying drawings wherein:

FIG. 1 is a partially sectioned side elevational view partially illustrating a lift truck having its mast assembly shown in its extended condition of operation and employing an adjustable chain anchor embodiment of the present invention therein;

FIG. 2 is an enlarged top elevational view of the mast assembly, partially sectioned to illustrate a pair of adjustable chain anchors;

FIG. 3 is a partially sectioned and enlarged side elevational view, illustrating an adjustable chain anchor; and FIG. 4 is a view similar to FIG. 1, but illustrating application of the chain anchor to another type of mast assembly.

BEST MODE OF CARRYING OUT THE INVENTION

FIGS. 1 and 2 partially ilustrate a lift truck 10 having a mast assembly 11 mounted forwardly thereon in a conventional manner. The mast assembly includes a fixed upright assembly 12, suitably mounted on the frame of the truck and having a pair of laterally-spaced uprights 13,14 secured together by transverse tie bars. A multi-stage movable upright assembly 15 is slidably mounted on the fixed upright assembly to be selectively raised and lowered thereon by a lift system 16.

Lift system 16 includes a pair of laterally spaced lift chains 17 each having a first end securely anchored to a lower end of movable upright assembly 15 by an anchor and bracket assembly 18. The second end of each chain is securely anchored to an upper end of fixed upright assembly 12 by an adjustable chain anchor 19, mounted on a bracket assembly 20 secured between uprights 13,14 of the fixed upright assembly. As described more fully hereinafter, adjustable chain anchor 19 exhibits a high degree of compactness and is designed to be positioned at a convenient location on the upper end of the fixed upright assembly to facilitate servicing, including periodic adjustment of the tension in chain 17.

Still referring to FIGS. 1 and 2, lift system 16 further includes a pair of sheaves 21 each having a respective chain 17 entrained thereover and rotatably mounted on a bracket 22 secured to movable upright assembly 15. A pair of single stage, single-acting hydraulic cylinders 23 each has a housing 24 suitably secured on a backside of fixed upright assembly 12 and a reciprocal rod 25 suitably secured at its upper end to bracket 22. Thus, selective extension and retraction of cylinders 23 will function to raise and lower the movable upright assembly on the fixed upright assembly under control of chains 17. During such selective movement of the movable upright assembly, it is highly desirable to maintain proper and equal tensions in lift chains 17, for purposes well known in the art.

Referring to FIG. 3, the tension in each chain 17 can be precisely set by a respective adjustable chain anchor 19. The adjustable chain anchor includes a cam member 26 pivotally mounted on a fixed pivot pin 27 for pivotal movement about a fixed axis A thereof. As shown in FIG. 2, the pin is mounted in a bifurcated bracket 28 formed integrally with bracket assembly 20 and is secured against axial movement thereon by a pair of cross-pins 29. Alternatively, cam member 26 could be secured on pin 27 with the pin being rotatably mounted on bracket 28.

Cam member 26 is in the form of a bellcrank having a first arm 30 and a circumferentially spaced second arm 31, shown as disposed at approximately a right angle relative to each other. The end portion of chain 17 anchored to fixed upright assembly 12 is secured to radially extending first arm 30 by a pin 32 of the chain. Cam member 26 has an arcuate cam surface 33 formed thereon, between arms 30 and 31, that engages the generally flat and substantially continuous outside surfaces of the adjacent chain links in bearing contact, as shown in FIG. 3.

Arm 31 extends radially outwardly and rearwardly of pin 27 to overly an adjustment means 34, shown in the form of a bolt 35 threadably mounted through a plate 36 secured beneath bracket 28. A lock nut 37 functions to lock the bolt in a preset axial position whereby an end of the bolt will engage arm 31 to retain it in an adjusted rotative position about axis A. Thus, predetermined and equallized tensions can be continuously maintained in chains 17 by periodically resetting adjustment means 34, as needed. Although cam surface 33 is preferably concentric about axis A, it should be understood that the surface could be formed eccentric, if so desired.

Referring once again to FIG. 1, multi-stage movable upright assembly 15 preferably includes a first movable upright assembly 39 slidably mounted directly on fixed upright assembly 12 and a second movable upright assembly 40 slidably mounted on the first movable upright assembly. As shown, each chain 17 is anchored at 18 to a lower end of second movable upright assembly 40 whereby extension of cylinder 23 will raise the first and second movable upright assemblies simultaneously.

A standard carriage assembly 41, having forks 42 mounted thereon, is slidably mounted on second movable upright assembly 40. The carriage assembly is adapted to be elevationally moved on the upright assembly by a single cylinder 43 and a pair of chains 44. The cylinder's housing is suitably secured on upright assembly 40 and a first end of each chain 44 is secured thereon at a standard adjustable chain anchor 45. As shown in FIG. 2, the rod end of cylinder 43 has a bracket assembly 46 secured thereon and a pair of sheaves 47 are rotatably mounted on the bracket assembly and have chains 44 entrained thereover. The second end of the chains are suitably securely anchored to a backside of carriage assembly 41 whereby selective extension and retraction of cylinder 43 will elevationally move the carriage assembly on upright assembly 40.

FIG. 4 illustrates application of adjustable chain anchor 19 to another type of mast assembly 11'. Identical numerals depict constructions corresponding to those shown in FIGS. 1-3, but with a prime symbol (') accompanying numerals depicting modified constructions in FIG. 4.

In the FIG. 4 mast assembly 11', second moveable upright assembly 40 has been eliminated, along with cylinder 43 and chains 44, and chains 17 are each secured to a backside of a carriage assembly 41' at a standard anchor and bracket assembly 18'. It can be seen in FIG. 4 that selected extension of cylinder 23 will function to simultaneously slide moveable upright assembly 39 upwardly on fixed upright assembly 12 and carriage assembly 41' upwardly on the moveable upright assembly. For purposes herein, the term "moveable assembly" may be deemed to generally define a moveable upright assembly or a moveable carriage assembly.

Industrial Applicability

Mast assembly 11 and 11' find particular application to industrial trucks, such as a lift truck of the type partially illustrated in FIGS. 1 and 4. During operation of the lift truck 10 in FIG. 1, the operator will normally retract mast assembly 15 to engage and support a load on forks 42. Thereafter, cylinders 23 and 43 can be suitably extended and retracted to position the load elevationally for transport and storage purposes.

After periodic use, lift chains 17 may tend to slacken, thus requiring readjustment to maintain the proper equallized tension therein. As shown in FIG. 3, each such adjustment can be accomplished expeditiously by backing-off lock nut 37 and rotating bolt 35 to pivot cam member 26 counterclockwise about fixed axis A. After the proper tension has been achieved, lock nut 37 can be turned-down to secure bolt 35 in its preset axial position against arm 31 of the cam member. A like procedure could be followed to adjust the tension in the second lift chain with the tension in both chains being preferably the same.

The tensions in chains 17, employed in mast assembly 11' in FIG. 4, are adjusted in a similar manner.

Although adjustable chain anchor 19 finds particular application to the lift chains for mast assemblies, as described above, it should be understood that it has application to other apparatus wherein a pair of members are slidably mounted relative to each other and a chain is anchored between the members. It should be noted in FIG. 3 that the compact design of the adjustable chain anchor facilitates its mounting in a relatively small amount of space. In addition, the bearing loads imposed on cam member 26 by the chain are substantially absorbed by pin 27 and only a small amount of loading is transmitted to adjustment means 34. Also, the moment or lever arm provided between axis A and the point at which adjustment bolt 35 engages arm 31 provides a system for finite adjustment and a substantial mechanical advantage for rotating the cam member to tension the chain.

Other aspects, objects and advantages of this invention can be obtained from a study of the drawings, the description and the appended claims.

What is claimed is:

1. In a mast assembly (11/11') having a fixed upright assembly (12), a movable assembly (15/41') movably mounted on said fixed upright assembly (12), and a lift system (16) including a least one chain (17) having opposite ends thereof anchored to said fixed upright (12) and movable (15/41') assemblies, the improvement comprising:

means (19) for adjusting the tension in said chain (17) in response to selective rotation of at least one end of said chain (17) about a pivot axis (A) including a cam member (26) pivotally mounted on said fixed upright assembly (12), an arcuate (33) cam surface formed on said cam member (26) and having said chain (17) wrapped in bearing relationship thereon, first (30) and second (31) circumferentially spaced arms secured on said cam member (26) to extend radially outwardly therefrom, said chain (17) attached to said first arm (30), and adjustment means (34) for engaging said second arm (31) to selectively pivot said member (26) about said axis (A), including a bolt (35) threadably mounted on said fixed upright assembly (12) and having an end thereof engaging said second arm (31).

2. The mast assembly (11) of claim 1 wherein said movable assembly includes a movable upright assembly (40).

3. The mast assembly (11') of claim 1 wherein said movable assembly includes a movable carriage assembly (41').

4. A lift truck (10/10') having a mast assembly (11/11') mounted forwardly thereon, said mast assembly (11/11') including:
   a fixed upright assembly (12),
   a movable assembly (15/41') movably mounted on said fixed upright assembly (12), and
   a lift system (16) including
   at least one fluid cylinder (23) interconnected between said fixed upright (12) and movable (15/41') assemblies,
   at least one chain (17) having opposite ends thereof anchored to said fixed upright (12) and movable (15/41') assemblies, and
   means (19) for adjusting the tension in said chain (17) in response to selective rotation of at least one end of said chain (17) about a pivot axis (A) including a cam member (26) pivotally mounted on said fixed upright assembly (12), an arcuate cam surface (33) formed on said cam member (26) and having said chain (17) wrapped in bearing relationship thereon, first (30) and second (31) circumferentially spaced arms secured on said cam member (26) to extend radially outwardly therefrom, said chain (17) attached to said first arm (30), and adjustment means (34) for engaging said second arm (31) to selectively rotate said member (26) about said axis (A), including a bolt (35) threadably mounted on said fixed upright assembly (12) and having an end thereof engaging said second arm (31).

5. The lift truck (10) of claim 4 wherein said movable assembly (15) includes a first moveable upright assembly (39) slidably mounted on said fixed upright assembly (12) and a second movable upright assembly (40) slidably mounted on said first moveable upright assembly (39), said chain (17) anchored to said second moveable upright assembly (40).

6. The lift truck (10) of claim 5 further including a carriage (41) slidably mounted on said second movable upright assembly (40) and means (43,44) for moving said carriage (41) on said second moveable upright assembly (40).

7. The lift truck (10') of claim 4 further including a movable upright assembly (39) slidably mounted on said fixed upright assembly (12) and wherein said movable assembly includes a carriage assembly (41') slidably mounted on said movable upright assembly (39), said chain (17) anchored to said carriage assembly (41').

8. In an apparatus having a first member (12), a second member (41/41') mounted for relative sliding movements on said first member (12), and at least one chain (17) having opposite ends thereof anchored to said first (12) and second (40/41') members, the improvement comprising:
   means (19) for adjusting the tension in said chain (17) in response to selective rotation of at least one end of said chain (17) about a pivot axis (A) including a cam member (26) pivotally mounted on said first member (12) and having an arcuate cam surface (33) formed thereon, an end portion of said chain (17) being wrapped on said cam surface (33) in bearing relationship thereon, a first arm (30) secured on said cam member (26) to extend radially outwardly therefrom, the end portion of said chain (17) being attached to said first arm (30), a second arm (31) secured on said cam member (26) to extend radially outwardly therefrom and displaced circumferentially from said first arm (30) and a bolt (35) threadably mounted on said first member (12) and having an end thereof engaging said second arm (31).

* * * * *